(12) United States Patent
Dam et al.

(10) Patent No.: US 9,529,244 B2
(45) Date of Patent: Dec. 27, 2016

(54) SYSTEM AND METHOD FOR PROCESSING ELECTROMAGNETIC RADIATION

(75) Inventors: Jeppe Seidelin Dam, Lyngby (DK); Peter Tidemand-Lichtenberg, Hørsholm (DK); Knud Palmelund Sørensen, Søborg (DK); Christian Pedersen, Hvidovre (DK)

(73) Assignee: DANMARKS TEKNISKE UNIVERSITET, Kgs. Lyngby (DK)

( * ) Notice: Subject to any disclaimer, the term of this patent is extended or adjusted under 35 U.S.C. 154(b) by 273 days.

(21) Appl. No.: 14/129,742

(22) PCT Filed: Jun. 28, 2012

(86) PCT No.: PCT/EP2012/062561
§ 371 (c)(1),
(2), (4) Date: Aug. 20, 2014

(87) PCT Pub. No.: WO2013/001001
PCT Pub. Date: Jan. 3, 2013

(65) Prior Publication Data
US 2015/0001375 A1    Jan. 1, 2015

Related U.S. Application Data

(60) Provisional application No. 61/501,861, filed on Jun. 28, 2011.

(30) Foreign Application Priority Data

Jun. 28, 2011 (EP) ..................................... 11171634

(51) Int. Cl.
*H04N 5/378* (2011.01)
*G02F 1/35* (2006.01)
(Continued)

(52) U.S. Cl.
CPC ............ *G02F 1/3544* (2013.01); *G01S 7/4811* (2013.01); *G01S 7/4915* (2013.01); *G01S 17/89* (2013.01);
(Continued)

(58) Field of Classification Search
CPC ..... H04N 1/3876; H04N 5/378; G02F 1/3534; G02F 1/3544; H01S 3/0092
See application file for complete search history.

(56) References Cited

U.S. PATENT DOCUMENTS 3,610,932 A * 10/1971 Morse ................... G02F 1/3534
                                                          250/333
3,612,896 A    10/1971 Firester
(Continued)

FOREIGN PATENT DOCUMENTS

EP       214645 A1    1/2010
WO    2010006985 A2   1/2010

OTHER PUBLICATIONS

Seidelin et al., "High-resolution two-dimensional image upconversion of incoherent light", Optics Letters:vol. 35, No. 22, Nov. 15, 2010.
(Continued)

*Primary Examiner* — Daniel Petkovsek
(74) *Attorney, Agent, or Firm* — Brinks Gilson & Lione (57) ABSTRACT

The present invention relates to a system and a method for processing electromagnetic radiation. In particular, the present invention relates to conversion of light, such as light (28) comprising image information (34), from one wavelength interval to another wavelength interval. More in particular, the present invention relates to wavelength conversion of incident light (28) by means of optical mixing with a laser beam in a non-linear crystal (14). The method according to the present invention comprises receiving incoming electro-
(Continued)

magnetic radiation (28) and a laser beam (12) in a non-linear crystal, setting a plurality of phase match conditions within the non-linear crystal (14), obtaining a plurality of images of the processed electromagnetic radiation (30), and providing a first combined image (42) comprising a first part of a first image and comprising a second part of a second image. The wavelength conversion is realized in an intra-cavity arrangement by for example sum-frequency generation between the intra-cavity laser light (12) and the in-coupled radiation (28).

25 Claims, 8 Drawing Sheets

(51) Int. Cl.
| | | |
|---|---|---|
| *H01S 3/108* | (2006.01) | |
| *G01S 17/89* | (2006.01) | |
| *G01S 7/481* | (2006.01) | |
| *G01S 7/491* | (2006.01) | |
| *H04N 1/387* | (2006.01) | |
| *H01S 3/00* | (2006.01) | |
| *H01S 3/081* | (2006.01) | |
| *H01S 3/083* | (2006.01) | |
| *H01S 3/23* | (2006.01) | |

(52) U.S. Cl.
CPC .............. *G02F 1/35* (2013.01); *G02F 1/3534* (2013.01); *H01S 3/1083* (2013.01); *H04N 1/3876* (2013.01); *H04N 5/378* (2013.01); *H01S 3/0092* (2013.01); *H01S 3/083* (2013.01); *H01S 3/0815* (2013.01); *H01S 3/2383* (2013.01)

(56) References Cited

U.S. PATENT DOCUMENTS

| | | | | |
|---|---|---|---|---|
| 5,451,785 | A * | 9/1995 | Faris .................... | A61B 5/0086 |
| | | | | 250/330 |
| 6,320,886 | B1 * | 11/2001 | Dawber ................... | G02F 1/39 |
| | | | | 359/330 |
| 6,819,476 | B2 * | 11/2004 | Hunt ........................ | G02F 2/02 |
| | | | | 359/237 |
| 8,576,479 | B2 * | 11/2013 | Dam .................... | G02B 5/1876 |
| | | | | 359/326 |
| 8,971,361 | B2 * | 3/2015 | Pedersen ............... | H01S 3/1083 |
| | | | | 372/22 |
| 2001/0017727 | A1 | 8/2001 | Sucha et al. | |

OTHER PUBLICATIONS

R. Andrews, "Wide Angular Aperture Image Up-Conversion", IEEE Journal of Quantum Electronics, Nov. 8, 2011.
International Search Report and Written Opinion for PCT:EP2012:062561, mailed Oct. 19, 2012.

\* cited by examiner

SYSTEM AND METHOD FOR PROCESSING ELECTROMAGNETIC RADIATION

RELATED APPLICATIONS

This application claims the benefit under 35 U.S.C. §371 of International Patent Application No. PCT/EP2012/062561, having an international filing date of Jun. 28, 2012, which claims priority to European Application No. 11171634.6, filed on Jun. 28, 2011, and U.S. Application No. 61/501,861, filed on Jun. 28, 2011, the contents of all of which are incorporated herein by reference in their entirety.

The present invention relates to a system and a method for processing electromagnetic radiation. In particular, the present invention relates to conversion of light, such as light comprising image information, from one wavelength interval to another wavelength interval. More in particular, the present invention relates to wavelength conversion of incident light by means of optical mixing with a laser beam in a non-linear crystal.

Any discussion of the prior art disclosed herein should not be considered as an admission that such prior art is widely known or that the mentioned prior art necessarily forms part of the common general knowledge within the field of the present invention.

It is known that some electromagnetic detectors are more effective within one wavelength interval than within another wavelength interval. Furthermore, it is known that there is a need for more effective detectors within some wavelength intervals.

From WO 2010/006985 it is known to process incoming incoherent electromagnetic radiation, by means of a non-linear crystal. The non-linear crystal receives the incoherent electromagnetic radiation and receives a laser beam. As a result thereof processed electromagnetic radiation is generated within the non-linear crystal in dependence on the spatial overlap in the non-linear crystal between the incoherent electromagnetic radiation and the laser beam. The processed electromagnetic radiation comprises radiation in a second wavelength interval.

There is a need for an improvement of the known systems and methods for converting light, such as light containing image information, from one wavelength interval to another.

It is an object of the present invention to provide a new system and a new method that is reliable, is compact, can be manufactured at low cost, and has high conversion efficiency.

According to the present invention the above-mentioned and other objects are obtained by provision of a method for processing incoming electromagnetic radiation from an object space. The incoming electromagnetic radiation comprises radiation in a first wavelength interval.

The method comprises receiving the incoming electromagnetic radiation and a laser beam in a non-linear crystal. Interaction between the incoming electromagnetic radiation in the first wavelength interval and the laser beam may provide processed electromagnetic radiation comprising electromagnetic radiation in a second wavelength interval.

Furthermore, the method comprises (or allows) setting a plurality of phase match conditions within the non-linear crystal for the incoming electromagnetic radiation propagating in a first direction within the non-linear crystal. The plurality of phase match conditions includes a first phase match condition and a second phase match condition.

Furthermore, the method comprises (or allows) obtaining a plurality of images of the processed electromagnetic radiation. The plurality of images includes a first image that may be obtained during application of the first phase match condition and a second image that may be obtained during application of the second phase match condition. The first image may comprise a first image part corresponding to a first spatial part of the object space. The second image may comprise a second image part corresponding to a second spatial part of the object space.

Furthermore, the method comprises (or allows) providing a first combined image. The first combined image may comprise at least the first part of the first image and may comprise at least the second part of the second image.

Provision of the method according to the present invention has an advantage of enabling a larger acceptance cone for the incoming electromagnetic radiation. Thus, e.g. a larger image may be processed and/or a higher resolution image of the processed electromagnetic radiation may be obtained and/or a higher pixel image of the processed electromagnetic radiation may be obtained.

Another advantage of the method according to the present invention is provision of a combined image having a wavelength interval being a limited part of the second wavelength interval, such as enabling provision of a substantially monochromatic first combined image. Thus, a limited wavelength interval, such as a substantially monochromatic wavelength interval of the first wavelength interval of the incoming electromagnetic radiation may be selected and converted according to the present invention and a single image thereof may be provided.

According to the present invention the above-mentioned and other objects are obtained by provision of a system for processing incoming electromagnetic radiation from an object space. The incoming electromagnetic radiation comprises radiation in a first wavelength interval.

The system comprises a non-linear crystal being configured for receiving the incoming electromagnetic radiation and for receiving a laser beam. The system is configured such that interaction between the incoming electromagnetic radiation within the first wavelength interval and the laser beam may provide processed electromagnetic radiation that may comprise electromagnetic radiation in a second wavelength interval.

Furthermore, the system comprises a control device that may be configured for enabling setting a plurality of phase match conditions within the non-linear crystal for the incoming electromagnetic radiation propagating in a first direction within the non-linear crystal. The plurality of phase match conditions may include a first phase match condition and a second phase match condition.

Furthermore, the system comprises a detector being configured for obtaining a plurality of images of the processed electromagnetic radiation. The plurality of images includes a first image that may be obtained during application of the first phase match condition and includes a second image that may be obtained during application of the second phase match condition. The first image may comprise a first image part corresponding to a first spatial part of the object space. The second image may comprise a second image part corresponding to a second spatial part of the object space.

Furthermore, the system comprises a processor being configured for providing a first combined image. The first combined image may comprise at least the first part of the first image and may comprise at least the second part of the second image.

Provision of the system according to the present invention has an advantage of enabling a larger acceptance cone for the incoming electromagnetic radiation. Thus, e.g. a larger image may be processed and/or a higher resolution image of the processed electromagnetic radiation may be obtained and/or a higher pixel image of the processed electromagnetic radiation may be obtained.

Another advantage of the system according to the present invention is enabling provision of a combined image having a wavelength interval being a limited part of the second wavelength interval, such as enabling provision of a substantially monochromatic first combined image. Thus, a limited wavelength interval, such as a substantially monochromatic wavelength of the first wavelength interval of the incoming electromagnetic radiation may be selected and converted according to the present invention and a single image thereof may be provided.

According to the present invention the above-mentioned and other objects are obtained by provision of use of a system according to the present invention for analyzing an area (an object space) from which the incoming electromagnetic radiation emanates.

Provision of the use of the system according to the present invention has an advantage of enabling a larger acceptance cone for the incoming electromagnetic radiation. Thus, e.g. a larger image may be processed and/or a higher resolution image of the processed electromagnetic radiation may be obtained and/or a higher pixel image of the processed electromagnetic radiation may be obtained.

Another advantage of the use of the system according to the present invention is enabling provision of a combined image having a wavelength interval being a limited part of the second wavelength interval, such as enabling provision of a substantially monochromatic first combined image. Thus, a limited wavelength interval, such as a substantially monochromatic wavelength of the first wavelength interval of the incoming electromagnetic radiation may be selected and converted according to the present invention and a single image thereof may be provided.

BRIEF DESCRIPTION OF THE DRAWINGS

The above and other features and advantages of the present invention will become readily apparent to those skilled in the art by the following detailed description of exemplary embodiments thereof with reference to the attached drawings.

The figures are schematic and simplified for clarity, and they may merely show details which may be essential to the understanding of the invention, while other details may have been left out. Throughout, the same reference numerals are used for identical or corresponding parts.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and sufficient, and will fully convey the concept of the invention to those skilled in the art.

DETAILED DESCRIPTION

The incoming electromagnetic radiation may be monochromatic radiation or polychromatic radiation.

The object space may for instance comprise a gas and/or one or more solid state objects.

The object space may be an area from which the incoming electromagnetic radiation emanates.

The incoming electromagnetic radiation may for instance emanate from the object space be by means of absorption and/or reflection of light from a light source. For instance, light, such as laser light, may be propagating through the object space, such as a gas, which may absorb specific spectral lines of the light propagating through the gas. The light having propagated through the object space and being at least partly absorbed by the gas may be the incoming electromagnetic radiation. Thus, it may be possible to analyze the object space by means of processing the incoming electromagnetic radiation according to the present invention.

The incoming electromagnetic radiation may be provided by means of illuminating the object space by means of a light source, such as one or more lasers or another light source such as the sun, where after the light is reflected and/or absorbed/emitted by one or more objects within the object space and emitted towards the non-linear crystal.

The incoming electromagnetic radiation may be incoherent or coherent. More in particular, the incoming electromagnetic radiation may be:

temporally incoherent and spatially incoherent;
temporally incoherent and spatially coherent;
temporally coherent and spatially incoherent; or
temporally coherent and spatially coherent.

Each of the plurality of image parts (having corresponding spatial parts of the object space) may be chosen to be so narrow (i.e. e.g. radial narrow, e.g. by means of narrow concentric circles/cylinder) that the wavelength intervals within each image part are narrow, such as within 100 nm, such as within 50 nm, such as within 10 nm, such as within 5 nm. For instance, for an embodiment the wavelength interval for the first image part may be from 3.000 μm to 3.010 μm, and the wavelength interval for the second image part may be 3.010 μm till 3.020 μm.

The image parts may be chosen such that the wavelength intervals within each of the image parts of an image of the processed electromagnetic radiation range from 0.1% or less than 0.1% (such as less than 0.01%, less than 0.003%, or less than 0.001%) of the wavelength (i.e. the total wavelength range of the processed electromagnetic radiation) up to several percent thereof, such as 5%, 10%, or 20%.

The present invention may be configured for processing (converting) incoming radiation having a wavelength range of 200 nm, e.g. centred about 4.2 μm.

The wavelength of the processed electromagnetic radiation is determined by conservation of energy during the process of optical mixing. By sum frequency generation, the processed electromagnetic radiation will have the summed frequencies of a photon of the laser beam and a photon of the incoming electromagnetic radiation. For instance, by mixing of incoming electromagnetic radiation within the mid-IR range (i.e. 3-5 µm) and a 1064 nm laser beam, the resulting processed electromagnetic radiation with be approximately within the interval 785-877 nm.

An example where difference frequency mixing scheme is used, may be mixing a 532 nm laser beam with incoming electromagnetic radiation within a wavelength range of 3-5 µm (mid-IR light) which may result in processed electromagnetic radiation having wavelengths from 595-646 nm.

Obtaining an image of the processed electromagnetic radiation according to the present invention may include detecting an intensity distribution of the processed light. Detecting the intensity may furthermore include detecting the wavelength of the received light.

A laser or a laser assembly for emission of the laser beam may form part of the system.

The method according to the present invention may comprise emitting the laser beam from a laser.

The first part of the first image and the second part of the second image may represent radiation of an at least substantially similar wavelength interval.

The setting a plurality of phase match conditions may include adjusting or setting at least one of or any combination of the following:
    the wavelength of the laser beam,
    the rotational position of the non-linear crystal about a rotational axis that is non-parallel with a path of the incoming electromagnetic radiation through the non-linear crystal,
    the transverse position of the non-linear crystal in relation to a path of the incoming electromagnetic radiation through the non-linear crystal,
    the temperature of the non-linear crystal,
    a condition for electro optic tuning of the non-linear crystal, and
    application of stress to the non-linear crystal.

Setting the plurality of phase match conditions by means of adjusting or setting the wavelength of the laser beam may enable a fast adjusting or setting.

The first spatial part of the object space and the second spatial part of the object space may represent overlapping or adjacent parts of the object space.

The plurality of phase match conditions may include a third phase match condition. The plurality of images may include a third image obtained during application of the third phase match condition. The plurality of obtained images may include more than 10 such as more than 100. Each of the plurality of images may be obtained during different phase match conditions.

The third image may comprise a third image part corresponding to a third spatial part of the object space. The first combined image may comprise the third part of the third image.

The second image may comprise a first image part corresponding to the first spatial part of the object space. The third image may comprise a second image part corresponding to the second spatial part of the object space. The method may comprise providing a second combined image comprising the first part of the second image and comprising the second part of the third image.

An advantage of providing a plurality of combined images is the possibility to reconstruct images at a plurality of different wavelength intervals from a single data set (incoming electromagnetic radiation). Thus, the present invention may enable hyper-spectral imaging and/or multi-spectral imaging. Since a plurality of phase match conditions is utilized (e.g. to extend the image size of the first combined image), the hyper-spectral or multi-spectral information may by this method be made possible by little extra effort. For instance, provision of one additional combined image may in general be enabled by obtaining just one extra image of the processed electromagnetic radiation during application of just one extra phase match condition.

The plurality of provided combined images depends on the number of applied phase match conditions and the number of spatial parts that the obtained images are divided into. This is explained further below. The plurality of combined images may for instance be more than 5, such as more than 10, such as more than 20, such as more than 50.

For instance, the plurality of phase match conditions may include a fourth phase match condition. The plurality of images may include a fourth image obtained during application of the fourth phase match condition. The fourth image may comprise a second image part corresponding to the second spatial part of the object space. The third image may comprise a first image part corresponding to the first spatial part of the object space. The method may comprise providing a third combined image comprising the first part of the third image and comprising the second part of the fourth image.

Furthermore, the fourth image may comprise a fourth image part corresponding to a fourth spatial part of the object space. The first combined image may comprise the fourth part of the fourth image.

The laser beam may be an intra-cavity laser beam in a first cavity, such as a first unidirectional ring cavity. Alternatively, the laser beam may be a single-pass laser beam.

The laser beam may be pulsed. This may provide a higher intensity during the pulses than for a continuous wave laser using the same power. Alternatively, the laser beam of the present invention may be a continuous wave. Use of a continuous wave laser beam may in particular be an advantage if the incoming electromagnetic radiation from the object space is incoherent, temporally and/or spatially. Since incoherent (temporally and/or spatially) radiation from the object space rarely will be present in pulses, an improved conversion efficiency may be provided by use of a continuous wave laser beam. If a continuous wave laser beam is used the quantum efficiency for the conversion of the incoming electromagnetic radiation to the processed electromagnetic radiation may be up to 20% or higher.

The shortest wavelength of the second wavelength interval may be shorter than the shortest wavelength of the first wavelength interval.

The longest wavelength of the second wavelength interval may be longer than the longest wavelength of the first wavelength interval.

The non-linear crystal may be configured to be quasi phase matched, such as being poled, for conversion of the incoming incoherent electromagnetic radiation in the first wavelength interval to the processed electromagnetic radiation in the second wavelength interval.

The laser may for instance be any of the types: solid state, semiconductor, gas, or liquid. A pumping source for the laser may for instance be any of a flash lamp, semiconductor laser, solid state laser, or a light emitting diode.

The non-linear crystal may be phase matched to optimize the conversion of incoming electromagnetic radiation in a first wavelength interval to the processed radiation in the second wavelength interval. In order to obtain a good interaction between the incoming radiation and the laser beam phase matching (PM) or quasi phase matching (QPM)

may be required. If phase matching or quasi phase matching is not fulfilled, the generation of the processed radiation may essentially cancel due to destructive interference as the incoming radiations propagates through the nonlinear crystal.

The nonlinear crystal may be configured to be tuned for obtaining phase matching. This may be accomplished using angle tuning of the nonlinear crystal, by applying temperature or pressure to crystal or through quasi phase matching.

The nonlinear crystal may be configured to be poled for obtaining phase matching. This method may be referred to as quasi phase matching. By (synthetically) changing the direction of the polarization of the dipole moment of the nonlinear crystal periodically (or by utilizing any crystal having similar polarization of the dipole moment), quasi phase matching can be obtained. The periodicity may be specific to the interaction at hand. Two nonlinear crystals often used for quasi phase matching are PP KTP and PP $LiNbO_3$.

The non-linear crystal may be aperiodic poled. The nonlinear crystal may be a nonlinear photonic quasicrystal.

The non-linear crystal may be configured to be poled in a fanned or chirped manner. The fanning may imply that the periodicity of the poled crystal is different at different transverse positions in the crystal. Thus by translating the nonlinear crystal transversely with respect to the incoming radiation (or vice versa), different wavelength components (or intervals) of the incoming radiation can be quasi phase matched, thus efficiently processed. The poling may also include a chirped structure that may lead to broad spectral acceptance.

The nonlinear crystal may be a Brewster cut. This may be advantageous since it solves a practical problem that arises from the fact that three different wavelengths (or wavelength intervals) are involved, i.e. the wavelength (interval) of the incoming radiation, the wavelength of the laser beam and the wavelength (interval) of the processed beam. It may be difficult and expensive to manufacture dielectric coatings that can act as an anti-reflexion coating at all three wavelengths. However if the nonlinear crystal is Brewster cut, p-polarized will essentially be transmitted loss-less (or with very low loss), thereby elevating the need for coatings at the end surfaces. When using quasi phase matching all the three mentioned radiation fields can be p-polarized. Thus, periodically poled crystals with Brewster cut ends may in particularly be advantageous.

The incoming electromagnetic radiation may be incoherent.

The system according to the present invention may be configured for carrying out the method according to the present invention.

A laser and/or a laser assembly according to the present invention may be and/or comprise a light source that is a narrow band and/or high power and/or at least a near single mode light source.

The present invention may comprise focusing the incoming electromagnetic radiation on (or within) the non-linear crystal by means of a focusing arrangement (such as an optical element). Focusing may refer to infinity correction. Focusing may provide an improved coupling of incoming electromagnetic radiation into the non-linear crystal.

The non-linear crystal may be a non-linear Brewster cut crystal and/or the non-linear crystal may comprise an anti-reflective coating. Thus, an improved coupling of incoming electromagnetic radiation into the non-linear crystal may be provided.

The plurality of images may be obtained by means of a detector, such as a photodetector. The detector may be an Si-based detector. The detector may comprise a charge-coupled device (CCD).

For polychromatic incoming electromagnetic radiation, the first combined image may represent wavelengths of an interval that are narrower than the second wavelength interval. This may in particular be the case when polychromatic light is converted.

The method according to the present invention may comprise filtering of the processed electromagnetic radiation before obtaining the images thereof, i.e. the plurality of images of the processed electromagnetic radiation may be obtained after the processed electromagnetic radiation have been filtered. Such filtering may be provided by a filter.

The system according to the present invention may comprise a filter configured for filtering the processed electromagnetic radiation from the non-linear crystal for providing filtered processed electromagnetic radiation to the detector.

The filter may be a tunable and/or an interferometric filter. The filter may be an etalon (may also be known as a Fabry-Perot interferometer/filter) or any comb filter. For improving the operation of the filter, it may be important that the processed electromagnetic radiation is collimated before being incident on the filter. The processed electromagnetic radiation emanating from the non-linear crystal may be diverging. Thus, an optical element may be provided for collimating and directing the processed electromagnetic radiation from the non-linear crystal towards the filter. The processed electromagnetic radiation, which departs from the filter, may by means of an optical element be focused towards the detector. Throughout the present description, the term "focus" may refer to "converge".

Use of an etalon for filtering the processed electromagnetic radiation may in particular be advantageously in order to obtain an improved spectral resolution for each image of the obtained plurality of images.

Figure 1:
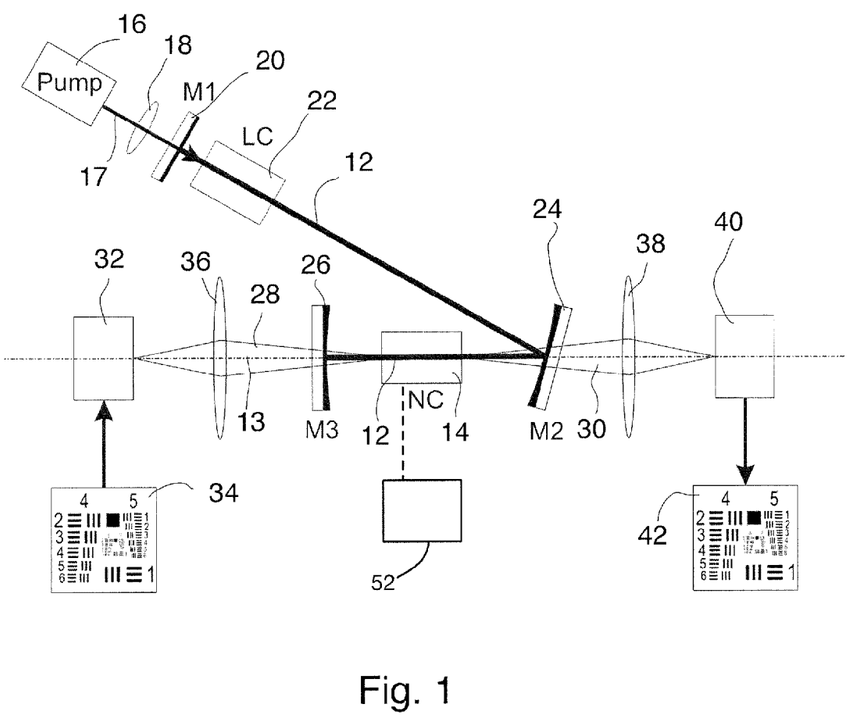
FIGS. 1-3 schematically illustrate exemplary embodiment that may be used as part of one or more embodiments according to the present invention.

FIG. 1 schematically illustrates an exemplary embodiment which is similar in appearance and functionality to the embodiment of FIG. 13 of WO 2010/006985. Reference in terms of the function of the embodiment of FIG. 1 of the present description for processing incoming electromagnetic radiation is therefore made to WO 2010/006985.

In FIG. 1, the laser beam 12, which is received by the non-linear crystal (NC) 14, is an intra-cavity laser beam 12, i.e. the non-linear crystal 14 is provided inside the cavity of the laser beam 12 similar to the explanation given in connection with FIG. 13 of WO 2010/006985.

In FIG. 1, the intra-cavity laser beam 12 is generated by means of a pump source 16 that emits a laser beam 17 through a first optical element 18 and through a first semi-reflective mirror (M1) 20 and into a laser crystal (LC) 22. Thus, by means of the pump source 16, the laser crystal 22, the first semi-reflective mirror 20, a second semi-reflective mirror (M2) 24, and a third semi-reflective mirror (M3) 26, the intra-cavity laser beam 12 is generated and sustained. The semi-reflective mirrors 20, 24, and 26 are substantially (or at least partly) reflective within the wavelength range of the intra-cavity laser beam 12 such that the laser beam 12 is maintained within the cavity provided by the semi-reflective mirrors 20, 24, and 26. The first semi-reflective mirror 20 is substantially (or at least partly) transmissive within the wavelength range of the laser beam 17 emitted by the pump source 16. The part of the laser beam 12 that propagates within the non-linear crystal 14 propagates along the axis 13.

The second semi-reflective mirror 24 and the third semi-reflective mirror 26 are arranged such that the intra-cavity laser beam is substantially (or at least partly) focused within the non-linear crystal 14. This is achieved by concave surfaces of the reflecting parts of the second semi-reflective mirror 24 and the third semi-reflective mirror 26. Thus, a higher intensity of the laser beam 12 may be provided within the non-linear crystal 14.

The object space 32 is illustrated by a box. A schematically illustrated image 34 serves as an example of image information emanating from the object space 32 towards the non-linear crystal 14. Emanating light, i.e. the incoming electromagnetic radiation 28, is focused by means of a second optical element 36 through the third semi-reflective mirror 26 and towards the non-linear crystal 14. The third semi-reflective mirror 26 is substantially (or at least partly) transmissive within the wavelength range of the incoming electromagnetic radiation 28. By focusing the incoming electromagnetic radiation 28 a higher intensity may be provided. Within the non-linear crystal 14 interaction between the incoming electromagnetic radiation 28 and the laser beam 12 occurs, e.g. by means of sum frequency generation and/or another non-linear optical mixing process such as difference frequency generation. Thus, processed electromagnetic radiation 30 is generated in dependence on the spatial overlap between the focused incoming electromagnetic radiation 28 and the intra-cavity laser beam 12.

The processed electromagnetic radiation 30 propagates from the non-linear crystal 14 through the second semi-reflective mirror 24 through the third optical element 38 focusing the radiation 30 where after the processed electromagnetic radiation 30 is incident on the detector 40 that detects distribution and intensity of the processed electromagnetic radiation 30 being incident thereon. Thus, an image 42 of the processed electromagnetic radiation 30 may be obtained. The second semi-reflective mirror 24 is substantially (or at least partly) transmissive within the wavelength range of the processed electromagnetic radiation 30.

It is of importance to realize that due to conservation of energy and momentum during the non-linear process of optical mixing of the incoming electromagnetic radiation 28 and the laser beam 12, the direction of propagation of the resulting processed electromagnetic radiation 30 depends upon the direction of propagation of the incoming electromagnetic radiation 28 within the non-linear crystal 14 and of the direction of propagation of the laser beam 12 within the non-linear crystal 14, the latter being substantially fixed. Thus, electromagnetic radiation 28 emanating from specific spatial parts of the object space 32 will result in corresponding processed electromagnetic radiation 30 being incident on corresponding specific spatial parts of the detector 40. Thus, there is a correspondence between spatial parts of the object space 32 emanating the incoming electromagnetic radiation 28 and image parts of an obtained image 42 of the processed electromagnetic radiation 30. Thus, imaging is feasible. Note that for simplicity in FIG. 1 only the propagation of incoming electromagnetic radiation 28 emanating from one spatial part of the object space 32 is illustrated.

Furthermore, it is of importance to realize that the phase match condition within the non-linear crystal 14 depends among other things on the angle between the direction of propagation of the laser beam 14 within the non-linear crystal 14 and the direction of propagation of the incoming electromagnetic radiation 28 within the non-linear crystal 14. This is realized due to that the summation of the k-vectors of: the laser beam, the incoming radiation, and the non-linear crystal must be zero in order to achieve phase match. Thus, for different directions of propagation of the incoming electromagnetic radiation 28 in relation to a fixed direction of propagation of the laser beam 12 and a fixed position of the non-linear crystal 14, the conditions for achieving phase match are different, i.e. a different wavelength of the incoming electromagnetic radiation will be phase matched. Thus, depending on the angle between the incoming radiation 28 and the laser beam 12, different wavelengths of the incoming radiation 28 will be processed (converted).

The direction of propagation of the laser beam 12 within the non-linear crystal 14 is substantially fixed whereas the direction of propagation of the incoming electromagnetic radiation 28 within the non-linear crystal 14 depends upon which spatial part of the object space 32 the incoming electromagnetic radiation 28 emanates from. This is furthermore illustrated by means of FIGS. 6-9.

Figure 2:
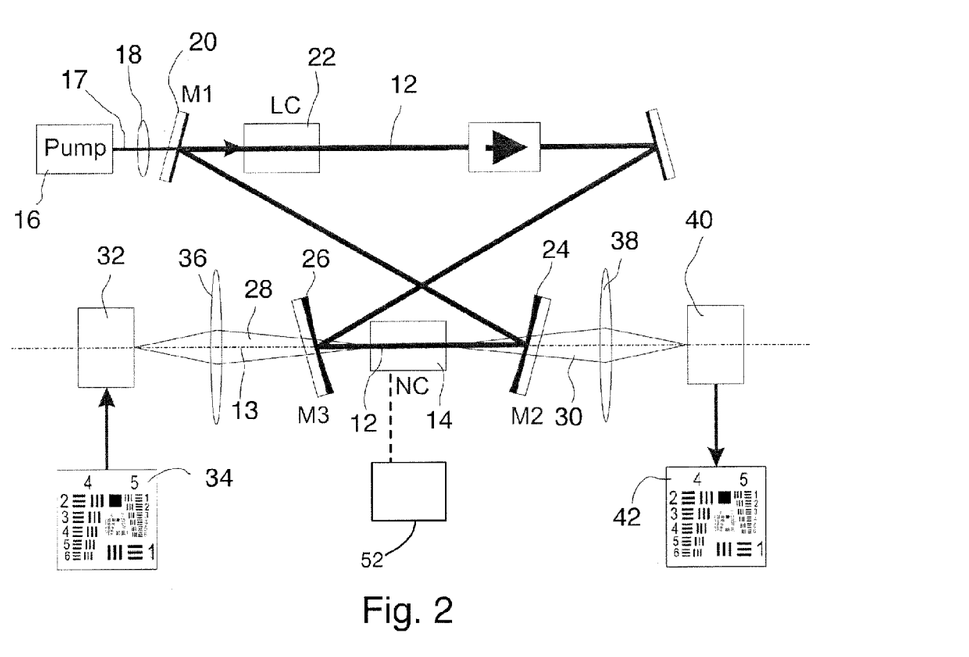
Figure 3:
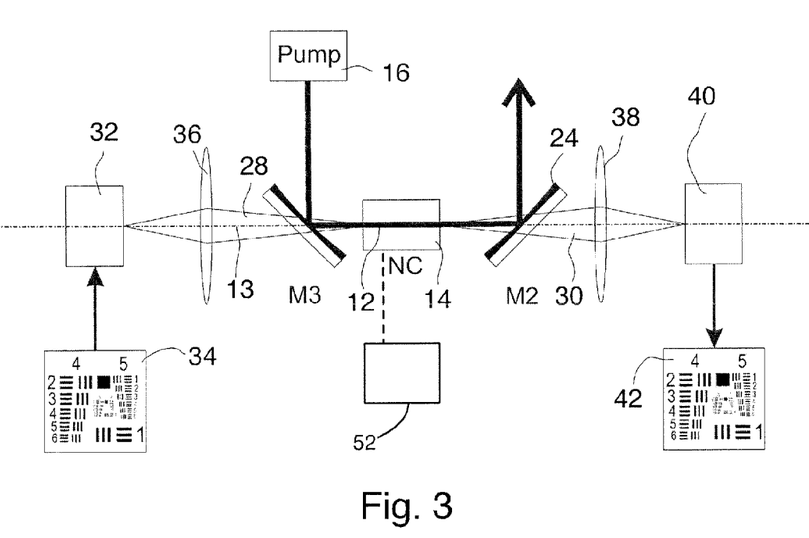
Figure 6:
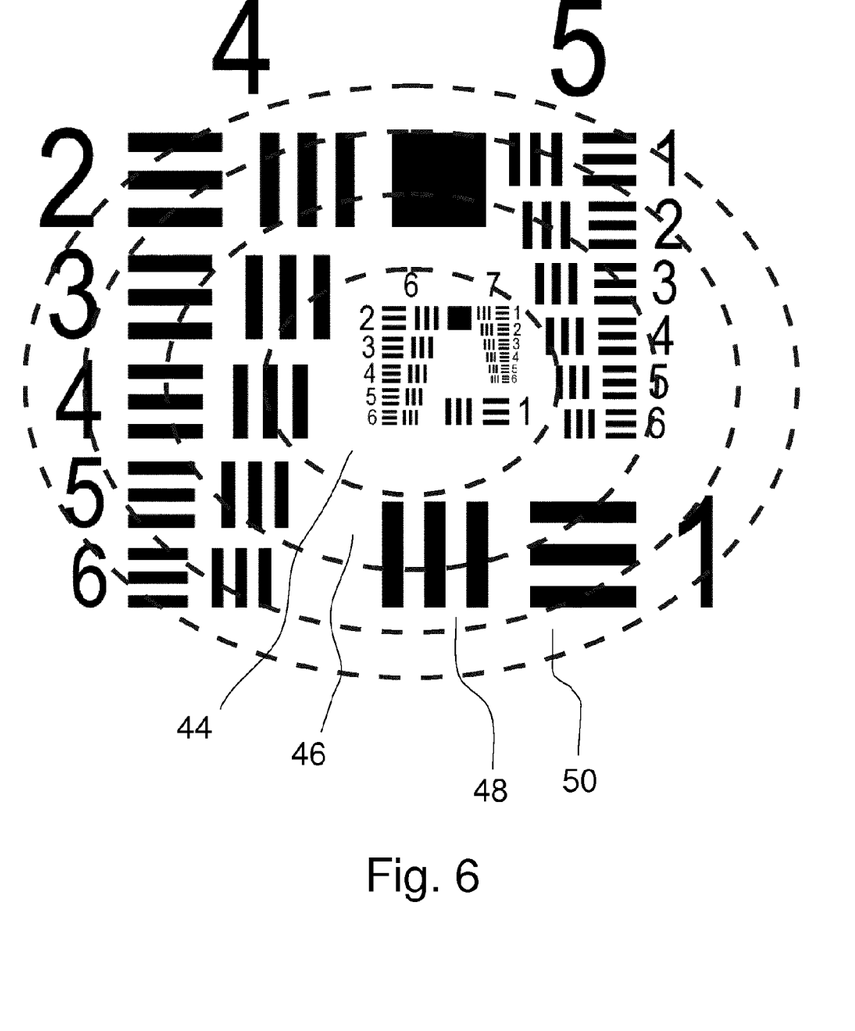
FIG. 6 schematically illustrates an image of processed electromagnetic radiation that may correspond to the incoming electromagnetic radiation of FIGS. 1-3.

FIG. 6 schematically illustrates an image 42 of the processed electromagnetic radiation 30 resulting from the incoming electromagnetic radiation 28 emanating from the object space 32, e.g. as illustrated in any of FIGS. 1-3. Furthermore, in FIG. 6 exemplary areas (image parts) are illustrated by means of enclosing concentric ellipses (dotted lines). As indicated above, the image parts of an image 42 of the processed electromagnetic radiation 30 correspond to similar spatial parts of the object space emanating the incoming electromagnetic radiation 28. The concentric ellipses illustrate four image parts (i.e. a first 44, a second 46, a third 48, and a fourth 50) of the image 42 of the processed electromagnetic radiation 30. The four image parts correspond to four similar spatial parts of the object space 32. Each of the illustrated image parts represents different wavelength intervals as explained in the following.

Due to the condition for phase match, only the incoming electromagnetic radiation 28 with a wavelength within a first wavelength interval (that is specific) and emanating from the first spatial part of the object space 32 will interact with the laser beam 12 within the non-linear crystal 14 and will generate the processed electromagnetic radiation 30 being incident on and generate the first image part 44 of the image 42.

For incoming electromagnetic radiation 28 emanating from the second spatial part of the object space 32 only incoming electromagnetic radiation 28 within a second wavelength range will interact with the laser beam 12 and will be incident on and generate the second image part 46 of the image 42.

Likewise, for incoming electromagnetic radiation 28 emanating from the third and fourth spatial parts of the object space 32 only incoming electromagnetic radiation 28 within a third and fourth wavelength range will interact with the laser beam 12 and will be incident on and generate the third and fourth image parts 48, 50, respectively.

The specific conversion condition illustrated by means of FIG. 6 arises due to the aligning of the object space 32 and the axis 13 illustrated in FIGS. 1-3. Thus, the electromagnetic radiation 28 emanating from the centre of the object space 32, which centre is within the first spatial part, is propagating parallel with the laser beam 12 within the non-linear crystal 14. Thus, it is evident that depending on the setup of the system according to the present invention for processing incoming electromagnetic radiation from an object space, the conversion needs not only be according to concentric ellipses but other shapes may apply.

Figure 9:
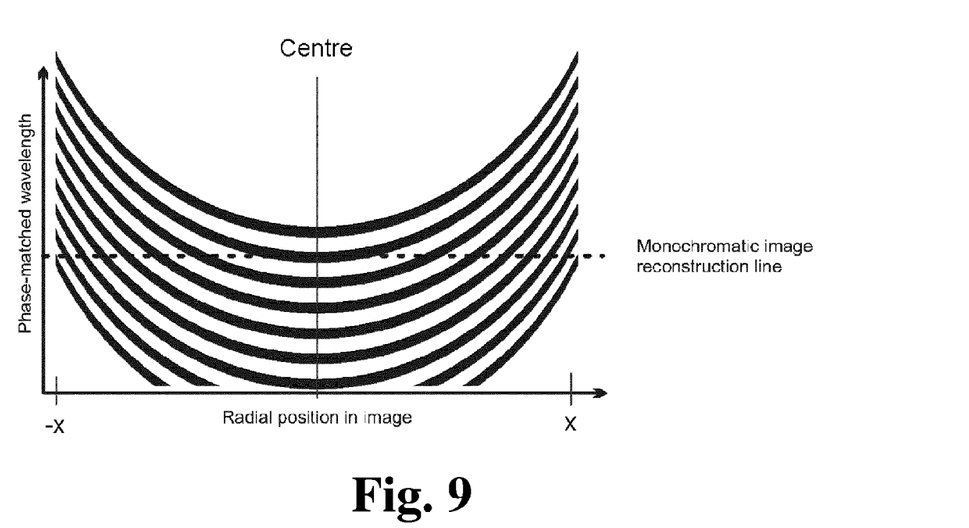
FIG. 9 schematically illustrates phase matched wavelength as a function of radial position in an image.

It is furthermore important to realize that the phase match condition for the interaction of the incoming electromagnetic radiation 28 within the non-linear crystal 14 may be changed/adjusted by one or more of the above-mentioned settings (i.e. e.g. by adjusting the wavelength of the laser beam 12 and/or by adjusting a condition for the non-linear crystal 14, such as the temperature). FIG. 9 schematically illustrates the wavelength of the incoming electromagnetic radiation 28 for which the phase match condition will be achieved ("Phase-matched wavelength") as a function of the radial position of the image part ("Radial position in image") for the situation illustrated in FIG. 6. The solid black curves represent nine different phase match conditions.

From FIG. 9 it is furthermore evident that in order to obtain conversion of a narrow wavelength interval (e.g. around the dotted line in FIG. 9 representing a substantially monochromatic image reconstruction line) of the incoming electromagnetic radiation covering the radial position from −x to x in the image 42, it is needed to apply a plurality of phase match conditions.

Returning to FIG. 6, it is thus evident that the wavelengths of the image 42 of the processed (converted) electromagnetic radiation 30 is changing (increasing/decreasing) continuously along a radial line given that the incoming electromagnetic radiation 28 comprises corresponding wavelengths that changes in a corresponding radial, continuously changing manner, i.e. that the incoming radiation 28 contains the specific wavelengths emanating from the specific spatial parts of the object space 32.

In FIG. 6, the wavelength range (or interval) within the first image part 44 is a first wavelength range. The wavelength range within the second image part 46 is the first wavelength range plus a first amount. The wavelength range within the third image part 48 is the first wavelength range plus a second amount. The wavelength range within the fourth image part 50 is the first wavelength range plus a third amount. The first image is obtained during a first phase match condition.

The phase match condition may be changed (second phase match condition) such that an obtained second image comprises similar first 44, second 46, third 48, and fourth 50 image parts, and where: the wavelength range within the first image part 44 is the first wavelength range minus a first amount, the wavelength range within the second image part 46 is the first wavelength range, the wavelength range within the third image part 48 is the first wavelength range plus the first amount, and the wavelength range within the fourth image part 50 is the first wavelength range plus the second amount.

Likewise, the phase match condition may be changed (third phase match condition) such that an obtained third image comprises similar first 44, second 46, third 48, and fourth 50 image parts, and where: the wavelength range within the first image part 44 is the first wavelength range minus a second amount, the wavelength range within the second image part 46 is the first wavelength range minus the first amount, the wavelength range within the third image part 48 is the first wavelength range, and the wavelength range within the fourth image part 50 is the first wavelength range plus the first amount.

Likewise, the phase match condition may be changed (fourth phase match condition) such that an obtained fourth image comprises similar first 44, second 46, third 48, and fourth 50 image parts, and where: the wavelength range within the first image part 44 is the first wavelength range minus a third amount, the wavelength range within the second image part 46 is the first wavelength range minus the second amount, the wavelength range within the third image part 48 is the first wavelength range minus the first amount, and the wavelength range within the fourth image part 50 is the first wavelength range.

Thus, by combining the first image part of the first image with the second image part of the second image and the third image part of the third image and the fourth image part of the fourth image, a combined image may be provided. The combined image represents only radiation within the first wavelength range, which is narrow compared to the wavelength range of the processed electromagnetic radiation for each of the first, second, third, and fourth images.

Furthermore, a second combined image may be provided by combining the first image part of the second image and the second image part of the third image and the third image part with the fourth image.

By obtaining just one more image (a fifth image with fifth phase match condition) having a fourth image part 50, where the wavelength range within the fourth image part 50 is the first wavelength range minus the first amount, and by furthermore combining this fourth image part of the fifth image within the second combined image, the second combined image will represent the same spatial parts as the first combined image.

Thus, any plurality of combined images may be provided according to the described method.

For provision of a plurality of combined images, where the plurality of combined images are representing the same spatial parts of the object space 32 the provided number of combined images may be equal to the number of applied phase match conditions minus the number of parts (image parts) in excess of one that each of the combined images are composed of.

The setting of a plurality of phase match conditions within the non-linear crystal may e.g. be achieved by means of a continuous sweep of the phase match conditions while the plurality of images of the processed electromagnetic radiation are obtained, e.g. periodically. For instance, the different phase match conditions may be applied by means a sweep of the wavelength of the laser beam, i.e. the laser beam is swept across a laser wavelength interval, while the plurality of images of the processed electromagnetic radiation are obtained, e.g. periodically. Thus, the applied (or set) plurality of phase match conditions is those present during obtaining each of the plurality of images.

Figure 7:
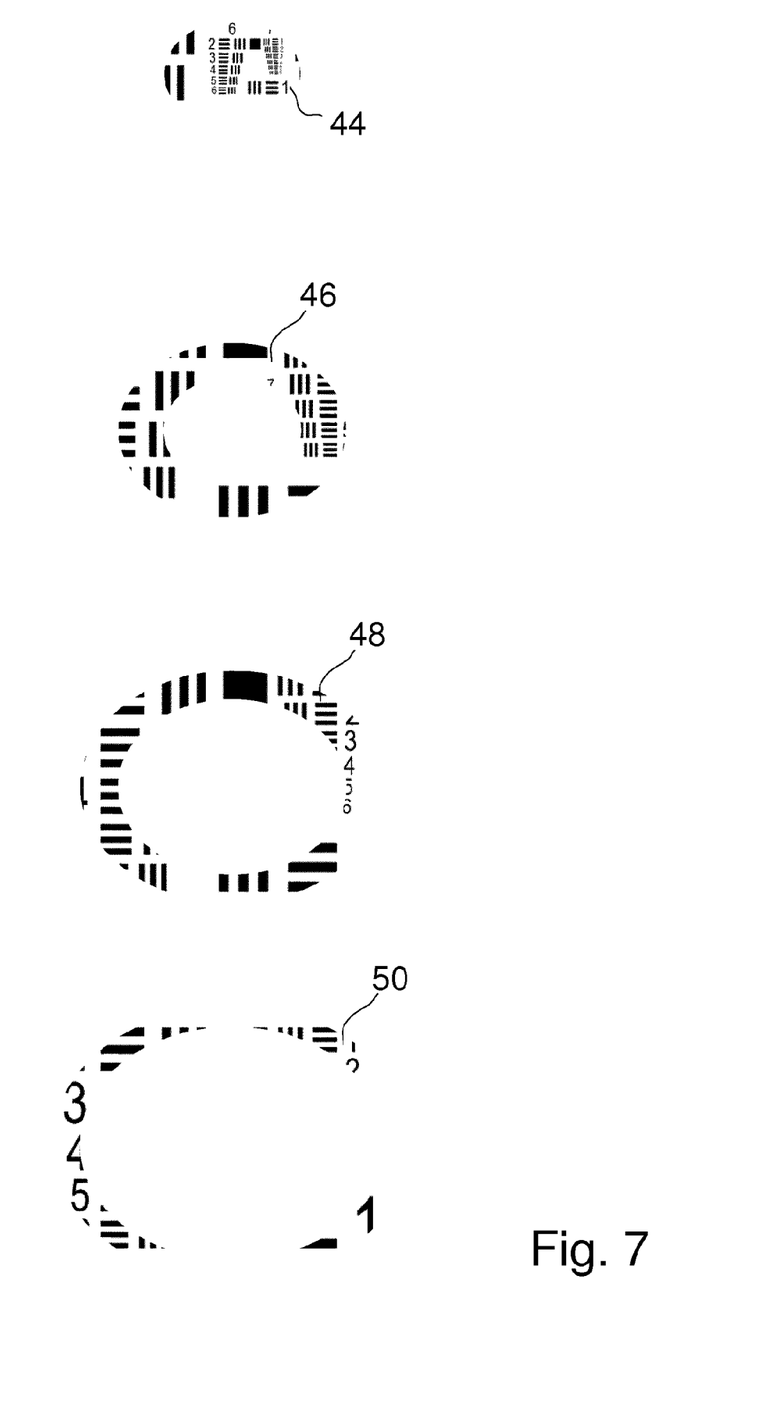
FIG. 7 schematically illustrates four image parts of processed electromagnetic radiation that may correspond to the incoming electromagnetic radiation of FIGS. 1-3.
Figure 8:
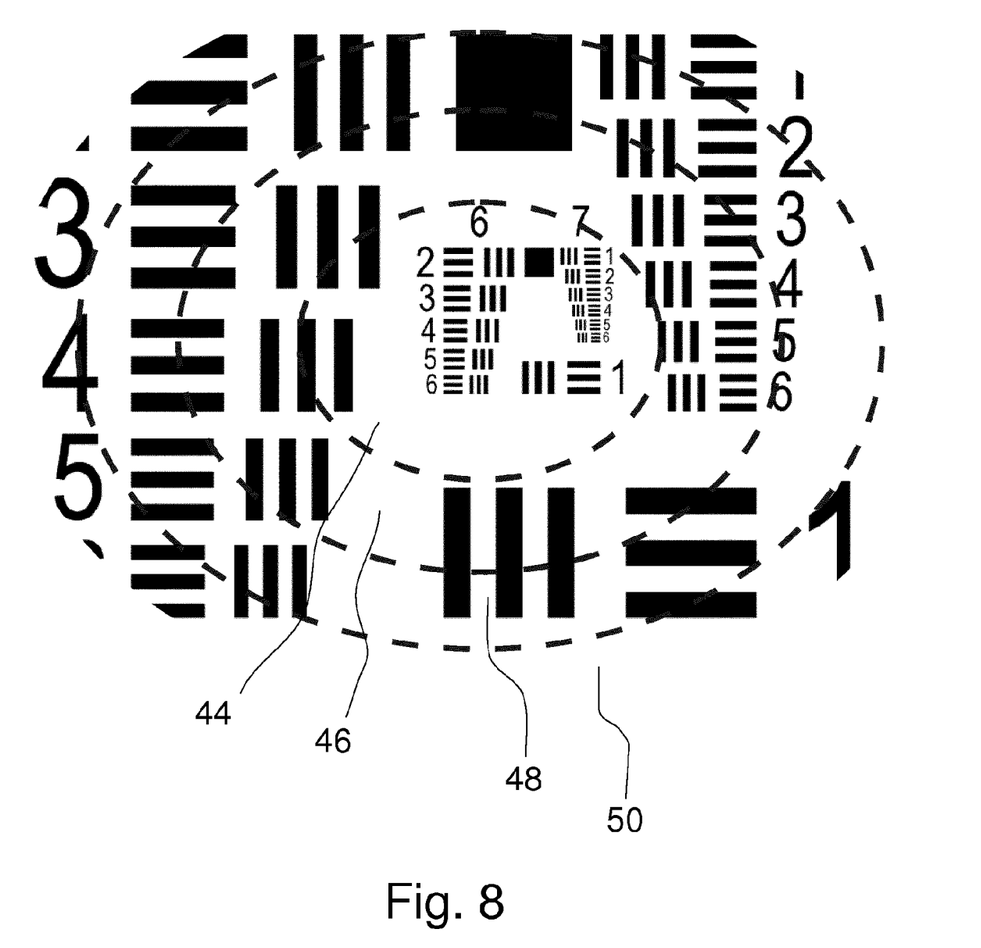
FIG. 8 schematically illustrates a first combined image comprising the image parts of FIG. 7.

FIGS. 7 and 8 schematically illustrate how the first combined image (a reconstructed image) may be obtained according to the present invention for narrow bandwidth incoming radiation such as monochromatic incoming radiation. The situation is similar as explained in connection with FIG. 6. The difference is that only specific image parts (only one image part if incoming radiation is monochromatic) will comprise image information for each obtained image. FIG. 7 illustrates: a first image part 44 obtained during a first phase match condition, a second image part 46 obtained during a second phase match condition, a third image part 48 obtained during a third phase match condition, and a fourth image part 50 obtained during a fourth phase match condition. Thus, a first combined image comprising the image parts illustrated in FIG. 7 may be provided as illustrated in FIG. 8.

The laser beam 12 may be provided in different ways as exemplified by means of the embodiments of FIGS. 2 and 3.

In FIG. 2 the laser beam 12 is an intra-cavity laser beam 12 in a unidirectional ring cavity. Except for the provision of the laser beam 12, the embodiment illustrated in FIG. 2 functions in the same or substantially the same way as the embodiment illustrated in FIG. 1. Thus, reference is made to FIG. 1 in terms of the functioning of these parts.

In FIG. 3 the laser beam is not an intra-cavity laser beam. For an embodiment according to FIG. 3 it may in particular be an advantage to use a pulsed laser. Except for the provision of the laser beam 12, the embodiment illustrated in FIG. 3 functions in the same or substantially the same way as the embodiment illustrated in FIG. 1 and/or FIG. 2. Thus, reference is made to FIG. 1 in terms of the functioning of these parts.

In FIG. 3, the laser beam is a single-pass laser beam.

Figure 10:
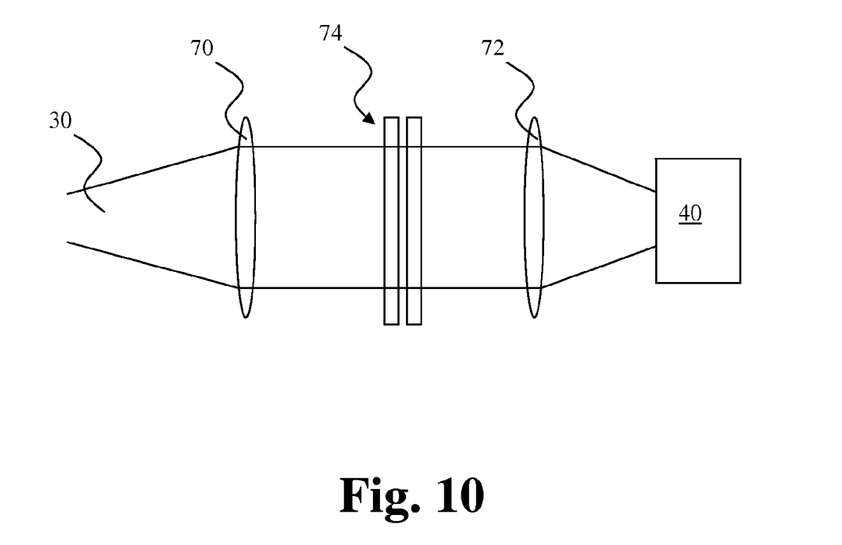
FIG. 10 schematically illustrates a part of an embodiment according to the present invention.

FIG. 10 schematically illustrates that the processed electromagnetic radiation 30 is provided to the detector 40 via a fourth optical element 70, a filter 74, and a fifth optical element 72. The combination of the fourth optical element 70, the filter 74, and the fifth optical element 72 may substitute the third optical element 38 for any of the embodiments according to the present invention, such as the embodiments illustrated in any of FIGS. 1-3 or any derivatives thereof according to the present invention.

Figure 4:
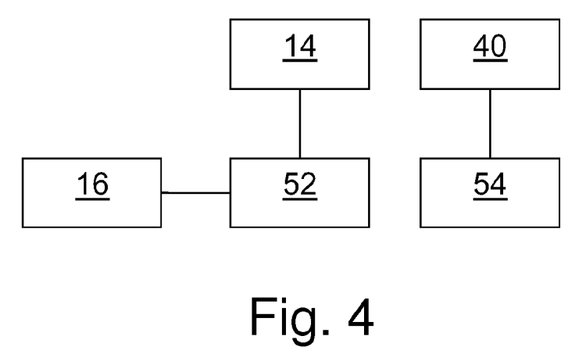
FIG. 4 schematically illustrates an exemplary embodiment that may be used as part of one or more embodiments according to the present invention.

FIG. 4 schematically illustrates a laser 16, a non-linear crystal 14, a detector 40, a control device 52, and a processor 54. The line between the detector and the processor indicates that image information from detector 40 is processed by the processor 54. The lines between the control device 52 and each of the laser 16 and the non-linear crystal 14 indicates that the control device 52 may be configured for setting the plurality of phase match conditions by controlling at least one of the non-linear crystal 14 and the laser 16, such as both of them.

Combining FIG. 4 with any of FIGS. 1-3 may illustrate embodiments of a system according to the present invention.

Figure 5:
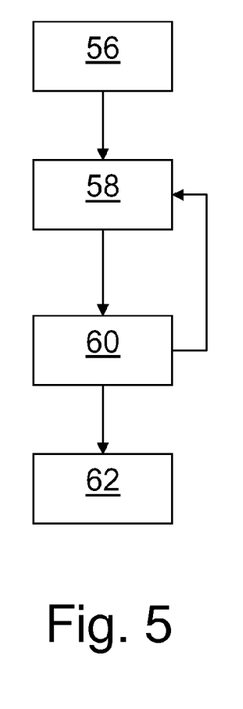
FIG. 5 schematically illustrates an embodiment of a method according to the present invention.

FIG. 5 schematically illustrates a method according to the present invention for processing incoming electromagnetic radiation from an object space. The incoming electromagnetic radiation comprises radiation in a first wavelength interval.

The method comprises receiving 56 the incoming electromagnetic radiation and a laser beam in a non-linear crystal, wherein interaction between the incoming electromagnetic radiation in the first wavelength interval and the laser beam provides processed electromagnetic radiation comprising radiation in a second wavelength interval.

The method furthermore comprises setting 56 a plurality of phase match conditions within the non-linear crystal for the incoming electromagnetic radiation propagating in a first direction within the non-linear crystal. The plurality of phase match conditions includes a first phase match condition and a second phase match condition.

The method furthermore comprises obtaining 60 a plurality of images of the processed electromagnetic radiation. The plurality of images includes a first image obtained during application of the first phase match condition and includes a second image obtained during application of the second phase match condition. The first image comprises a first image part corresponding to a first spatial part of the object space. The second image comprises a second image part corresponding to a second spatial part of the object space.

The method furthermore comprises providing 62 a first combined image comprising the first part of the first image and comprising the second part of the second image.

The setting 56 a plurality of phase match conditions and the obtaining 60 a plurality of images may be carried out such that during the setting of the first phase match condition, the first image is obtained, where after the second phase match condition is set and the second image is obtained during the setting of the second phase match condition. This is indicated by having one arrow pointing from the setting 56 and to the obtaining 60, whereas another arrow points in the opposite direction.

The present invention may be embodied according to any of the following items.

Items

1. Method for processing incoming electromagnetic radiation from an object space, the incoming electromagnetic radiation comprising radiation in a first wavelength interval, the method comprising:

receiving the incoming electromagnetic radiation and a laser beam in a non-linear crystal, wherein interaction between the incoming electromagnetic radiation in the first wavelength interval and the laser beam provides processed electromagnetic radiation comprising radiation in a second wavelength interval, setting a plurality of phase match conditions within the non-linear crystal for the incoming electromagnetic radiation propagating in a first direction within the non-linear crystal, the plurality of phase match conditions including a first phase match condition and a second phase match condition, obtaining a plurality of images of the processed electromagnetic radiation, the plurality of images including a first image obtained during application of the first phase match condition and including a second image obtained during application of the second phase match condition, the first image comprising a first image part corresponding to a first spatial part of the object space, the second image comprising a second image part corresponding to a second spatial part of the object space, and providing a first combined image comprising the first part of the first image and comprising the second part of the second image.

2. Method according to item 1, wherein the first part of the first image and the second part of the second image represent radiation of an at least substantially similar wavelength interval.

3. Method according to item 1 or 2, wherein the setting a plurality of phase match conditions includes adjusting or setting at least one of:

the wavelength of the laser beam, the rotational position of the non-linear crystal about a rotational axis that is non-parallel with a path of the incoming electromagnetic radiation through the non-linear crystal, the transverse position of the non-linear crystal in relation to a path of the incoming electromagnetic radiation through the non-linear crystal, the temperature of the non-linear crystal, a condition for electro optic tuning of the non-linear crystal, and application of stress to the non-linear crystal.

4. Method according to any of the preceding items, wherein the first spatial part of the object space and the second spatial part of the object space represents overlapping or adjacent parts of the object space.

5. Method according to any of the preceding items, wherein the plurality of phase match conditions includes a third phase match condition, the plurality of images includes a third image obtained during application of the third phase match condition, the third image comprising a third image part corresponding to a third spatial part of the object space, and the first combined image comprises the third part of the third image.

6. Method according to any of the preceding items, wherein the plurality of phase match conditions includes a third phase match condition, the plurality of images includes a third image obtained during application of the third phase match condition,
the second image comprises a first image part corresponding to the first spatial part of the object space,
the third image comprises a second image part corresponding to the second spatial part of the object space, and wherein
the method comprising providing a second combined image comprising the first part of the second image and comprising the second part of the third image.
7. A method according to any of the preceding items, wherein the laser beam is an intra-cavity laser beam in a first cavity, such as a first unidirectional ring cavity.
8. A method according to any of the preceding items, wherein the laser beam is pulsed.
9. Method according to any of the preceding items, wherein the shortest wavelength of the second wavelength interval is shorter than the shortest wavelength of the first wavelength interval.
10. Method according to any of the preceding items, wherein the non-linear crystal is configured to be quasi phase matched, such as being poled, for conversion of the incoming incoherent electromagnetic radiation in the first wavelength interval to the processed electromagnetic radiation in the second wavelength interval.
11. Method according to item 10, wherein the non-linear crystal is configured to be poled in a fanned or chirped manner.
12. Method according to any of the preceding items, wherein the incoming electromagnetic radiation is incoherent.
13. System for processing incoming electromagnetic radiation from an object space, the incoming electromagnetic radiation comprising radiation in a first wavelength interval, the system comprising:
    a non-linear crystal being configured for receiving the incoming electromagnetic radiation and for receiving a laser beam, such that interaction between the incoming electromagnetic radiation within the first wavelength interval and the laser beam provides processed electromagnetic radiation comprising radiation in a second wavelength interval,
    a control device being configured for enabling setting a plurality of phase match conditions within the non-linear crystal for the incoming electromagnetic radiation propagating in a first direction within the non-linear crystal, the plurality of phase match conditions including a first phase match condition and a second phase match condition,
    a detector being configured for obtaining a plurality of images of the processed electromagnetic radiation, the plurality of images including a first image obtained during application of the first phase match condition and including a second image obtained during application of the second phase match condition, the first image comprising a first image part corresponding to a first spatial part of the object space, the second image comprising a second image part corresponding to a second spatial part of the object space, and
    a processor being configured for providing a first combined image comprising the first part of the first image and comprising the second part of the second image.
14. System according to item 13 for carrying out the method according to any of the items 1-12.
15. Use of a system according to item 13 or 14, for analyzing an area from which the incoming electromagnetic radiation emanates.

The invention claimed is:
1. A method for processing polychromatic incoming electromagnetic radiation from an object space, the polychromatic incoming electromagnetic radiation comprising radiation in a first wavelength interval, the method comprising:
    receiving the polychromatic incoming electromagnetic radiation and a laser beam in a non-linear crystal, wherein interaction between the polychromatic incoming electromagnetic radiation in the first wavelength interval and the laser beam provides processed electromagnetic radiation comprising radiation in a second wavelength interval,
    setting a plurality of phase match conditions within the non-linear crystal for the polychromatic incoming electromagnetic radiation propagating in a first direction within the non-linear crystal, the plurality of phase match conditions including a first phase match condition and a second phase match condition,
    obtaining a plurality of images of the processed electromagnetic radiation, the plurality of images including a first image obtained during application of the first phase match condition and including a second image obtained during application of the second phase match condition, the first image comprising a first image part corresponding to a first spatial part of the object space, the second image comprising a second image part corresponding to a second spatial part of the object space, and
    providing a first combined image comprising the first image part of the first image and comprising the second image part of the second image, wherein the first combined image represents wavelengths of an interval that are narrower than the radiation in the second wavelength interval.
2. The method according to claim 1, wherein the incoming electromagnetic radiation is polychromatic and wherein the first combined image represents(?) wavelengths of an interval that are narrower than the radiation in the second wavelength interval.
3. The method according to claim 1, wherein the first part of the first image and the second part of the second image represent radiation of similar wavelength interval.
4. The method according to claim 1, wherein the setting a plurality of phase match conditions includes adjusting or setting at least one of:
    the wavelength of the laser beam,
    the rotational position of the non-linear crystal about a rotational axis that is non-parallel with a path of the incoming electromagnetic radiation through the non-linear crystal,
    the transverse position of the non-linear crystal in relation to a path of the incoming electromagnetic radiation through the non-linear crystal,
    the temperature of the non-linear crystal,
    a condition for electro optic tuning of the non-linear crystal, and
    application of stress to the non-linear crystal.
5. The method according to claim 1, wherein the first spatial part of the object space and the second spatial part of the object space represent overlapping or adjacent parts of the object space.
6. The method according to claim 1, wherein
    the plurality of phase match conditions includes a third phase match condition, and
    the plurality of images includes a third image obtained during application of the third phase match condition.

7. The method according to claim 6, wherein
the third image comprising a third image part corresponding to a third spatial part of the object space, and
the first combined image comprises the third part of the third image.

8. The method according to claim 6, wherein
the second image comprises a first image part corresponding to the first spatial part of the object space,
the third image comprises a second image part corresponding to the second spatial part of the object space, and wherein
the method comprising providing a second combined image comprising the first part of the second image and comprising the second part of the third image.

9. The method according to claim 1, wherein the laser beam is an intra-cavity laser beam in a first unidirectional ring cavity.

10. The method according to claim 9, wherein the first cavity is a first unidirectional ring cavity.

11. The method according to claim 1, wherein the laser beam is a continuous wave laser beam.

12. The method according to claim 1, wherein the shortest wavelength of the second wavelength interval is shorter than the shortest wavelength of the first wavelength interval.

13. The method according to claim 1, wherein the non-linear crystal is configured to be quasi phase matched for conversion of the incoming incoherent electromagnetic radiation in the first wavelength interval to the processed electromagnetic radiation in the second wavelength interval.

14. The method according to claim 13, wherein the non-linear crystal is aperiodically poled.

15. The method according to claim 1, wherein the incoming electromagnetic radiation is incoherent.

16. The method according to claim 1, the method comprising filtering of the processed electromagnetic radiation before obtaining the plurality of images of the processed electromagnetic radiation.

17. The method according to claim 16, wherein the filtering is configured to be tuned.

18. The method according to claim 17, wherein the filtering comprises use of an etalon.

19. The method according to claim 16, wherein the incoming electromagnetic radiation is temporally and/or spatially.

20. A system for processing polychromatic incoming electromagnetic radiation from an object space, the polychromatic incoming electromagnetic radiation comprising radiation in a first wavelength interval, the system comprising:
a non-linear crystal being configured for receiving the polychromatic incoming electromagnetic radiation and for receiving a laser beam, such that interaction between the polychromatic incoming electromagnetic radiation within the first wavelength interval and the laser beam provides processed electromagnetic radiation comprising radiation in a second wavelength interval,
a control device being configured for enabling setting a plurality of phase match conditions within the non-linear crystal for the polychromatic incoming electromagnetic radiation propagating in a first direction within the non-linear crystal, the plurality of phase match conditions including a first phase match condition and a second phase match condition,
a detector being configured for obtaining a plurality of images of the processed electromagnetic radiation, the plurality of images including a first image obtained during application of the first phase match condition and including a second image obtained during application of the second phase match condition, the first image comprising a first image part corresponding to a first spatial part of the object space, the second image comprising a second image part corresponding to a second spatial part of the object space, and
a processor being configured for providing a first combined image comprising the first image part of the first image and comprising the second image part of the second image, wherein the first combined image represents wavelengths of an interval that are narrower than the radiation in the second wavelength interval.

21. The system according to claim 20, wherein the incoming electromagnetic radiation is polychromatic and wherein the first combined image represents? wavelengths of an interval that are narrower than the radiation in the second wavelength interval.

22. The system according to claim 20, wherein the system comprises a filter configured for filtering the processed electromagnetic radiation from the non-linear crystal for providing filtered processed electromagnetic radiation to the detector.

23. The system according to claim 22, wherein the filter is a tunable filter.

24. The system according to claim 22, wherein the filter is an etalon.

25. A method for processing polychromatic incoming electromagnetic radiation from an object space, the polychromatic incoming electromagnetic radiation comprising radiation in a first wavelength interval, the method comprising:
providing the system according to claim 20;
communicating, to the system, a polychromatic incoming electromagnetic radiation and a laser beam; and
receiving, from the system, the first combined image that comprises the first image part of the first image and comprising the second image part of the second image.

* * * * *